US010852163B2

(12) United States Patent
Isoda et al.

(10) Patent No.: US 10,852,163 B2
(45) Date of Patent: Dec. 1, 2020

(54) ROTATION ANGLE DETECTION DEVICE AND ROTATION ANGLE DETECTION METHOD

(71) Applicant: Mitsubishi Electric Corporation, Tokyo (JP)

(72) Inventors: Hitoshi Isoda, Tokyo (JP); Yoshihiro Miyama, Tokyo (JP); Tatsuo Nishimura, Tokyo (JP); Hideaki Arita, Tokyo (JP); Shinji Nishimura, Tokyo (JP); Koji Nishizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/342,045

(22) PCT Filed: Oct. 31, 2016

(86) PCT No.: PCT/JP2016/082268
§ 371 (c)(1),
(2) Date: Apr. 15, 2019

(87) PCT Pub. No.: WO2018/078855
PCT Pub. Date: May 3, 2018

(65) Prior Publication Data
US 2019/0250011 A1 Aug. 15, 2019

(51) Int. Cl.
*G01D 5/14* (2006.01)
*G01D 5/244* (2006.01)
*G01D 5/245* (2006.01)

(52) U.S. Cl.
CPC ............. *G01D 5/145* (2013.01); *G01D 5/245* (2013.01); *G01D 5/2448* (2013.01)

(58) Field of Classification Search
CPC ................................ G01D 5/14; G01D 5/145
See application file for complete search history.

(56) References Cited

U.S. PATENT DOCUMENTS

2013/0002242 A1   1/2013   Tsukamoto et al.

FOREIGN PATENT DOCUMENTS

| CN | 105245194 A | 1/2016 |   |
| EP | 2500694 A2 * | 9/2012 | ............. F16H 59/70 |

(Continued)

OTHER PUBLICATIONS

Office Action dated Jan. 21, 2020 in Japanese Application No. 2018-547080.

(Continued)

*Primary Examiner* — Minh Q Phan
(74) *Attorney, Agent, or Firm* — Sughrue Mion, PLLC; Richard C. Turner

(57) ABSTRACT

A rotation angle detection device including: a rotor; a stator including "b" (b≥3) magnetic detection portions (MDPs) each including a bias magnetic field generation portion and a magnetic detection element (MDE); and a rotation angle processor calculating a rotation angle of the rotor based on a detection by the (MDEs). The rotor has convex and concave portions (CCPs), which change in "x" cycles for a mechanical angle 360 ("x"≥1) to make the MDEs possible to obtain a sine wave. There are arranged "b" MDPs along a circumferential direction of the stator for each cycle of the CCPs, which are arranged at intervals of a mechanical angle 360×(n×b+m)/(x×b), where "n" (n≥0) represents, by a number of cycles, a deviation amount of each of the MDPs from a reference position in the circumferential direction, and "m" (1≤m≤"b") represents a position of a MDP in an arrangement order.

20 Claims, 10 Drawing Sheets

(56) References Cited

FOREIGN PATENT DOCUMENTS

| | | | |
|---|---|---|---|
| JP | 8-219709 | A | 8/1996 |
| JP | 11-51695 | A | 2/1999 |
| JP | 2003-50270 | A | 2/2003 |
| JP | 2004-69655 | A | 3/2004 |
| JP | 2004-184115 | A | 7/2004 |
| JP | 2006-132978 | A | 5/2006 |
| JP | 2006-329888 | A | 12/2006 |
| JP | 2008-29070 | A | 2/2008 |
| JP | 2008-209340 | A | 9/2008 |
| JP | 2013-61346 | A | 4/2013 |
| WO | 2011/104961 | A | 9/2011 |

OTHER PUBLICATIONS

International Search Report for PCT/JP2016/082268 dated, Jan. 24, 2017 (PCT/ISA/210).
Communication dated Jul. 21, 2020, from the Japanese Patent Office in Application No. 2018-547080.
Communication dated Sep. 16, 2020 from the State Intellectual Property Office of the P.R.C. in Application No. 201680090366.X.

* cited by examiner

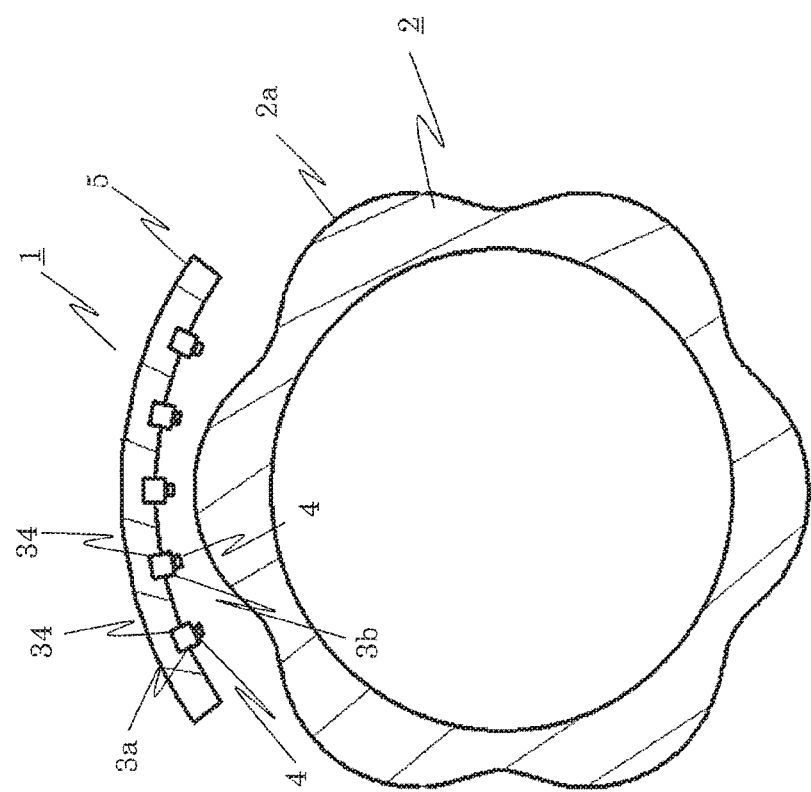

ROTATION ANGLE DETECTION DEVICE AND ROTATION ANGLE DETECTION METHOD

CROSS REFERENCE TO RELATED APPLICATIONS

This application is a National Stage of International Application No. PCT/JP2016/082268 filed Oct. 31, 2016.

TECHNICAL FIELD

The present invention relates to a rotation angle detection device, and more particularly, to a rotation angle detection device and a rotation angle detection device method, which use a change in magnetic intensity.

BACKGROUND ART

For example, in Patent Literature 1, there is disclosed a rotation detection device including: a rotor, which is provided to a rotary shaft supported by a housing including a bearing and configured to rotate, and rotation of which is to be detected; a semiconductor chip including a magnetic sensing element configured to sense a change in magnetic field in a vicinity of the rotor; and a bias magnet configured to apply a bias magnetic field to the magnetic sensing element, the rotation detection device being configured to detect a rotation mode of the rotor by sensing, with the magnetic sensing element, a change in magnetic field caused in association with the bias magnetic field when the rotor is rotated, the bearing and the semiconductor chip being formed integrally with the housing. Further, in Patent Literature 2 and Patent Literature 3, there are also disclosed a rotation detection device and a rotation detection sensor, which use a change in magnetic intensity.

CITATION LIST

Patent Literature

[PTL 1] JP 2006-132978 A
[PTL 2] JP 11-51695 A
[PTL 3] JP 08-219709 A

SUMMARY OF INVENTION

Technical Problem

For example, in the rotation detection device of Patent Literature 1, rectangular-shaped protrusions and recesses are formed along an outer peripheral surface of the rotor, and the rotation is detected by sensing, with the magnetic sensing element, a change in magnetic field caused in association with the bias magnetic field due to those protrusions and recesses.

It is an object of the present invention to provide a rotation angle detection device and the like for highly accurately detecting a rotation angle by forming, on a side of a rotor for which the rotation angle is to be measured, convex and concave portions, which change in a curved manner, smoothly, and periodically as in a sine wave, and detecting, with a plurality of magnetic detection elements, a change in magnetic field caused in association with a bias magnetic field due to those protrusions and recesses, which change smoothly and periodically.

Solution to Problem

According to one embodiment of the present invention, there are provided a rotation angle detection device and the like, including: a rotor made of a magnetic material; a stator including "b" or more magnetic detection portions each including a bias magnetic field generation portion and a magnetic detection element, where "b" represents an integer of 3 or more; and a rotation angle calculation processing unit configured to calculate a rotation angle of the rotor based on detection signals obtained by the magnetic detection elements, wherein a surface of the rotor that is opposed to the stator has convex and concave portions, which change in "x" cycles for a mechanical angle of 360 degrees, where "x" represents an integer of 1 or more, and the convex and concave portions have a shape that changes in a curved manner, the shape enabling each of the magnetic detection elements to obtain a substantially sine wave, and wherein "b" magnetic detection portions of the stator are arranged along a circumferential direction of the stator for each cycle of the convex and concave portions so as to be opposed to, with a gap from, the surface of the rotor that is opposed to the stator, and are arranged at intervals of a mechanical angle of $360 \times (n \times b + m)/(x \times b)$ degrees, where "n" represents, by a number of cycles, a deviation amount of each of the "b" magnetic detection portions from a reference position in the circumferential direction and represents an integer of 0 or more, and "m" represents a position of a magnetic detection portion in an arrangement order of the "b" magnetic detection portions and represents an integer of from 1 to "b".

Advantageous Effects of Invention

According to the embodiments of the present invention, it is possible to provide the rotation angle detection device and the like for highly accurately detecting a rotation angle by detecting, with the plurality of magnetic detection elements, a change in magnetic field caused in association with the bias magnetic field due to the convex and concave portions, which are formed on the rotor side and change in a curved manner, smoothly, and periodically as in a sine wave.

BRIEF DESCRIPTION OF DRAWINGS

FIG. 11 is a schematic sectional view of still another example of the detection unit of the rotation angle detection device according to the present invention.

DESCRIPTION OF EMBODIMENTS

Now, a rotation angle detection device and the like according to each of embodiments of the present invention are described with reference to the drawings. In each of the embodiments, the same or corresponding portions are denoted by the same reference symbols, and the overlapping description thereof is omitted.

First Embodiment

Figure 1:
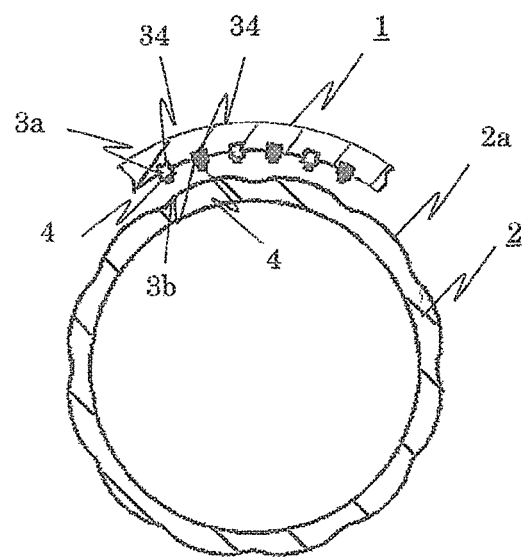
FIG. 1 is a schematic sectional view of a detection unit of a rotation angle detection device according to one embodiment of the present invention.

FIG. 1 is a schematic sectional view of a detection unit of the rotation angle detection device according to one embodiment of the present invention. On an outer periphery of a rotor 2, convex and concave portions 2a are formed. The convex and concave portions 2a have a shape that changes in a curved manner such that each of detection signals obtained by magnetic detection elements 4 is a substantially sine wave. In FIG. 1, x=12, that is, twelve convex and concave portions 2a are formed, and hence when the rotor 2 has rotated by a mechanical angle of 360 degrees, that is, has rotated once, waveforms corresponding to twelve cycles are obtained from each of the magnetic detection elements 4. In FIG. 1, for example, three magnetic detection elements 4 are arranged for each cycle of the convex and concave portions 2a. In FIG. 1, six magnetic detection elements 4 corresponding to two cycles are illustrated. Further, for one cycle of the convex and concave portions 2a, b=3, that is, three magnetic detection elements 4 are arranged at substantially the same intervals or at the same intervals, and hence when it is assumed that one cycle of the convex and concave portions 2a is 360 degrees, signals with a phase difference of 120 degrees are output from the three magnetic detection elements 4.

Each of the magnetic detection elements 4 is provided with a bias magnetic field generation portion 3a or 3b on a stator 1 side to form a magnetic detection portion 34.

In FIG. 1, further three magnetic detection portions 34 are added, and thus a total of six magnetic detection portions 34 are arranged. Through arrangement of each magnetic detection portion at substantially the same or the same phase position as that of adjacent one phase and through comparison of detection signals obtained at corresponding phase positions in one cycle with each other, the detection signals can be used for detection of a failure of the magnetic detection portion 34 and correction of decentering of the rotor 2 or the like. Thus, design that is robust against disturbance noise can be implemented.

It is only required that the convex and concave portions 2a have "x" cycles for the mechanical angle of 360 degrees, and "x" represents an integer of 1 or more. Further, it is only required that "b" magnetic detection portions 34 be arranged for one cycle of the convex and concave portions 2a, and "b" represents an integer of 3 or more.

Figure 2:
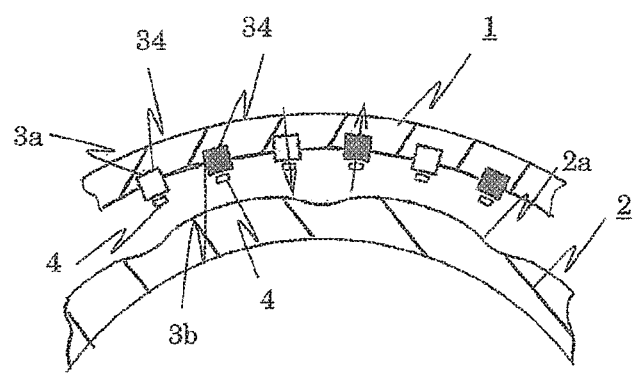
FIG. 2 is an enlarged cross-sectional view of a main part of the detection unit of FIG. 1.

FIG. 2 is an enlarged cross-sectional view of a main part of the detection unit of FIG. 1. An inner rotor, in which the rotor 2 is arranged inside, is used, and hence the magnetic detection elements 4 are arranged on an inner periphery of the bias magnetic field generation portion 3a or b. In this case, a white bias magnetic field generation portion 3a and a black bias magnetic field generation portion 3b are alternately arranged side by side. With this arrangement, for example, the bias magnetic field generation portion 3a has a vector, that is, a magnetic flux direction toward the inner peripheral side, and the bias magnetic field generation portion 3b has a vector, that is, a magnetic flux direction toward an outer peripheral side. Through such an arrangement in which the magnetic detection portions 34 having opposite magnetic flux directions are alternately arranged, an amount of magnetic flux linked to the magnetic detection elements 4 can be increased. However, the bias magnetic field generation portions alternately have opposite magnetic flux directions, and hence the directions of the bias magnetic field generation portions are required to be alternately changed between a direction toward the inner peripheral side and a direction toward the outer peripheral side.

In FIG. 2, the magnetic detection portions 34 having different magnetic flux directions are alternately arranged, but the arrangement is not limited thereto. Even when the magnetic detection portions 34 having the same magnetic flux direction are arranged, although intensities of the detection signals obtained by the magnetic detection elements 4 become smaller, the magnetic field can be detected.

Figure 3:
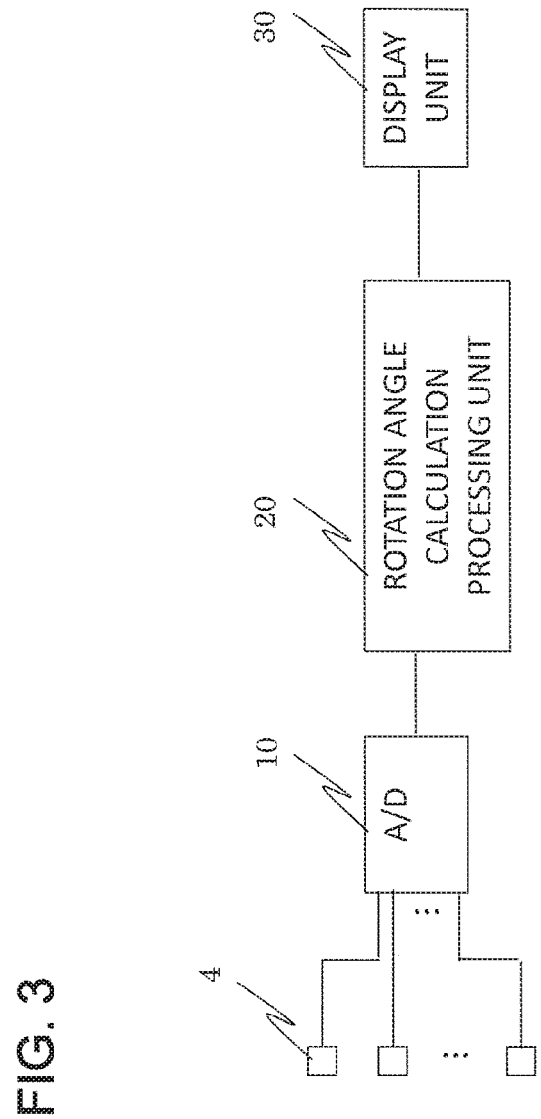
FIG. 3 is a configuration diagram of a rotation angle calculation unit of the rotation angle detection device according to one embodiment of the present invention.

FIG. 3 is a configuration diagram of a rotation angle calculation unit of the rotation angle detection device according to one embodiment of the present invention. The detection signal from each of the magnetic detection elements 4 is subjected to A/D conversion in an A/D conversion unit 10, and then the resultant signal is input to a rotation angle calculation processing unit 20. In the rotation angle calculation processing unit 20, rotation angle calculation is performed based on the detection signals, and the calculated rotation angle is displayed on, for example, a display unit 30.

Figure 4:
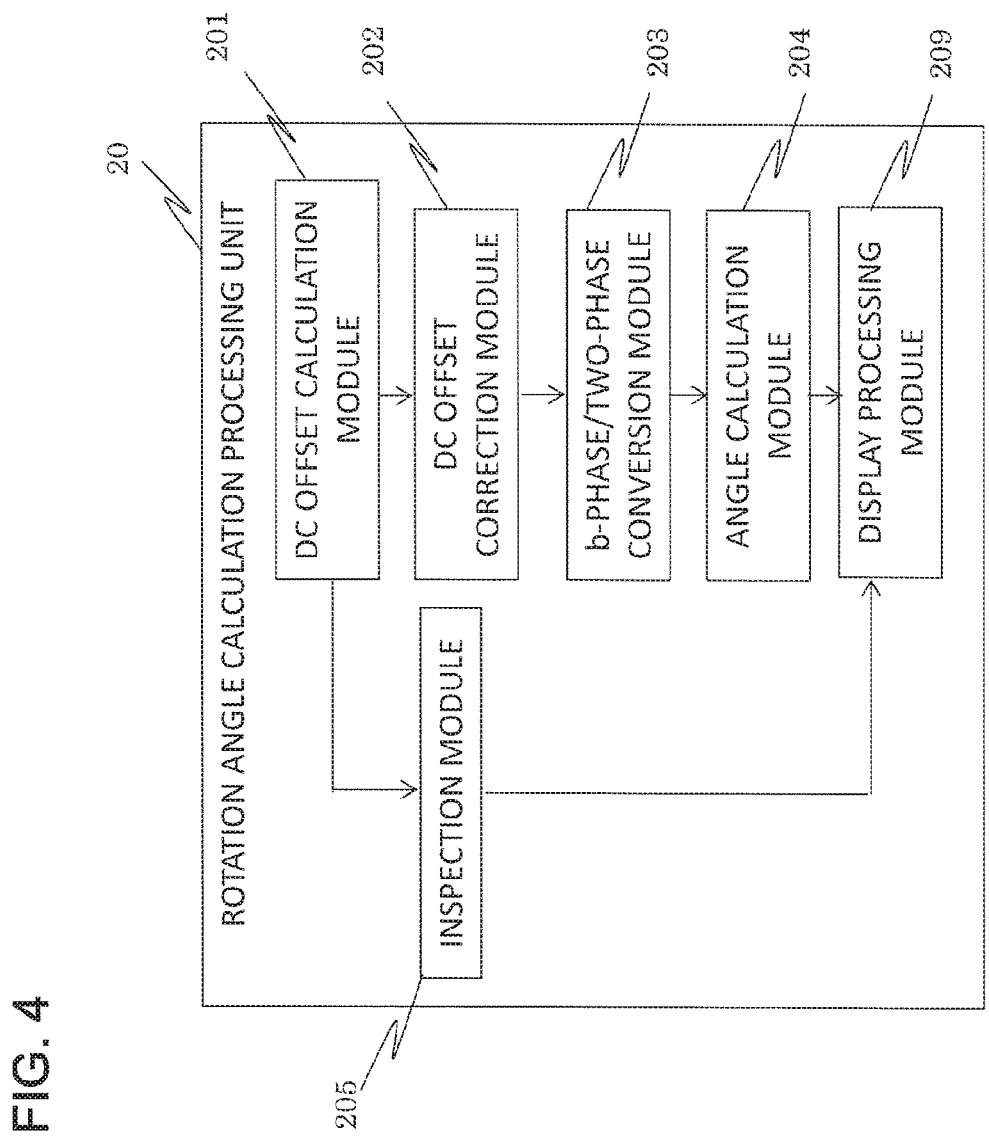
FIG. 4 is a diagram for illustrating an example of a functional block diagram of the rotation angle calculation processing unit of FIG. 3.

FIG. 4 is a diagram for illustrating an example of a functional block diagram of the rotation angle calculation processing unit of FIG. 3. The rotation angle calculation processing unit 20 includes a DC offset calculation module 201, a DC offset correction module 202, a b-phase/two-phase conversion module 203, an angle calculation module 204, an inspection module 205, and a display processing module 209. Functions of the respective modules are described later.

Figure 5:
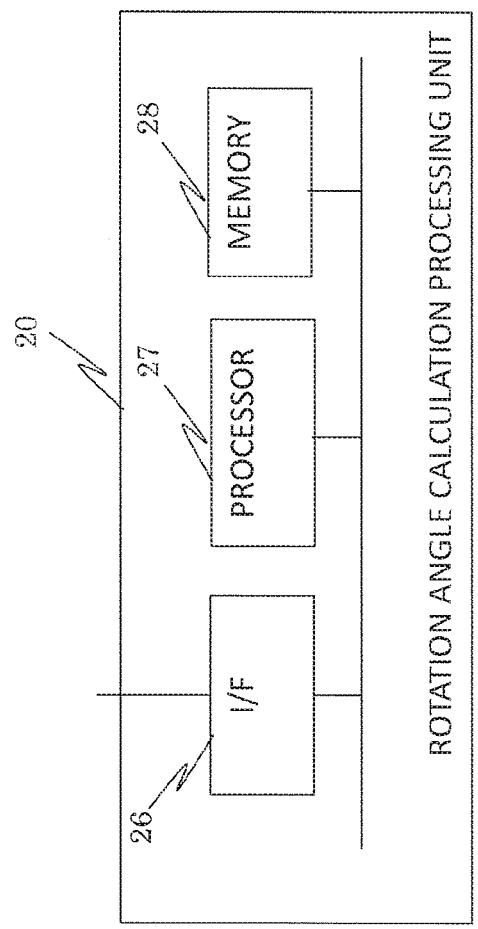
FIG. 5 is a diagram for illustrating an example of a hardware configuration of the rotation angle calculation processing unit of FIG. 3.

FIG. 5 is a diagram for illustrating an example of a hardware configuration of the rotation angle calculation processing unit of FIG. 3. The rotation angle calculation processing unit 20 is constructed of, for example, a computer. The detection signals from the "b" magnetic detection elements 4 corresponding to "b" phases, which have been subjected to digital conversion, are input to the rotation angle calculation processing unit 20 via an interface (I/F) 26. In a memory 28, programs corresponding to the respective functional blocks illustrated in FIG. 4 and preset data to be used for calculation are stored. A processor 27 performs rotation angle calculation processing on the detection signals input via the interface (I/F), in accordance with the programs and data stored in the memory 28. Then, the calculated rotation angle is output via the interface (I/F) 26, and is displayed on the display unit 30 of FIG. 3.

Referring back to FIG. 1, the rotor 2 is made of a magnetic material. The stator 1 includes "b" or more magnetic detection portions 34 each including the bias magnetic field generation portion 3 and the magnetic detection element 4. The bias magnetic field generation portion 3 is constructed of, for example, a permanent magnet. The magnetic detection element 4 is constructed of an electromagnetic conversion element, for example, a Hall device. Further, the rotation angle of the rotor 2 is calculated by the rotation angle calculation processing unit 20 based on the detection signals detected by the magnetic detection elements 4.

An amount of magnetic flux from the bias magnetic field generation portion 3 toward the rotor 2 side changes depending on a distance of a gap between the bias magnetic field generation portion 3 and a surface of the convex and concave portions 2a of the rotor 2. A change in magnetic field caused in association with the bias magnetic field of the bias magnetic field generation portion 3 due to protrusions and recesses of the convex and concave portions 2a, which change smoothly and periodically, is detected by the magnetic detection elements 4. Thus, the detection signal obtained by each of the magnetic detection elements 4 changes depending on the shape of the convex and concave portions 2a, and consequently changes depending on a rotation angle position of the rotor. Further, the change follows the shape of the convex and concave portions 2a, and becomes sine wave signals having different phases in this case. The b-phase sine wave signals having different phases are converted into two-phase signals having a relationship of a sine wave and a cosine wave. Through calculation of an arctan of the signals having a relationship of a sine wave and a cosine wave, a rotation angle position of the rotor 2 is obtained.

A surface of the rotor 2 that is opposed to the stator has the convex and concave portions 2a, which change in "x" cycles for the mechanical angle of 360 degrees, and the convex and concave portions 2a have a shape that changes in a curved manner, which enables each of the magnetic detection elements 4 to obtain a substantially sine wave or a sine wave. The symbol "x" represents an integer of 1 or more, and a case in which "x" is 12 is illustrated in FIG. 1 and FIG. 2.

There are arranged "b" magnetic detection portions 34 of the stator 1 along a circumferential direction of the stator 1 for one cycle of the convex and concave portions 2a so as to be opposed to, with a gap from, the surface of the rotor 2 that is opposed to the stator, and the magnetic detection portions 34 are arranged at intervals of 360/x×n+360/(x×b)×m degrees. The "360/x×n+360/(x×b)×m degrees" is reduced to "360×(n×b+m)/(x×b) degrees". In this case, "n" represents, by the number of cycles, a deviation amount of each of the magnetic detection portions 34 from a reference position in the circumferential direction and represents an integer of 0 or more, and "m" represents a position of a magnetic detection portion 34 in the arrangement order of the "b" magnetic detection portions 34 and represents an integer of from 1 to "b".

That is, as long as the phase position within a cycle is the same, through arrangement of the magnetic detection portion 34 at the same phase position in another cycle, the detection signals having an equivalent phase or the same phase can be obtained. In other words, the same detection signals can be obtained from the magnetic detection portions 34 as long as those magnetic detection portions 34 are arranged at the same phase position in each cycle. Therefore, the "b" magnetic detection portions 34 are not required to be arranged within one cycle.

With this configuration, even at a position of a cycle other than one cycle of the convex and concave portions 2a of the rotor 2, waveforms having equal intervals therebetween can be generated on the basis of one cycle of an electrical angle. With this, because the magnetic detection portions 34 are arranged on only a part of the stator 1 in its circumferential direction, a degree of freedom in layout of the magnetic detection portions 34 is increased. Thus, in a hollow motor having a large diameter, a yield rate of a material of the stator is improved.

Further, for example, when detection is to be performed within one cycle of the convex and concave portions 2a of the rotor 2 with the three magnetic detection portions 34 of FIG. 1 and FIG. 2 corresponding to one cycle, the magnetic detection portions are arranged at the intervals of the mechanical angle of 360/(x×b) degrees.

With this configuration, waveforms having equal intervals therebetween can be generated within one cycle of the convex and concave portions 2a of the rotor 2. As a result, because the magnetic detection portions are arranged in only one cycle of the convex and concave portions 2a of the rotor 2, a degree of freedom in layout is further increased.

Further, the bias magnetic field generation portion 3 is configured to generate magnetic flux in a radial direction of the rotor 2, and the magnetic detection element 4 has a detection surface arranged in such a direction as to detect the magnetic flux in the radial direction.

With this configuration, a resolver-type rotation angle detection device configured to detect the magnetic flux in the radial direction is implemented. Through generation of the magnetic flux in the radial direction and detection of the magnetic flux in the radial direction, for example, when the rotation angle detection device is applied to a motor, the entire length of the motor in its shaft direction can be reduced. Thus, a resonance frequency of the motor can be increased.

Figure 6:
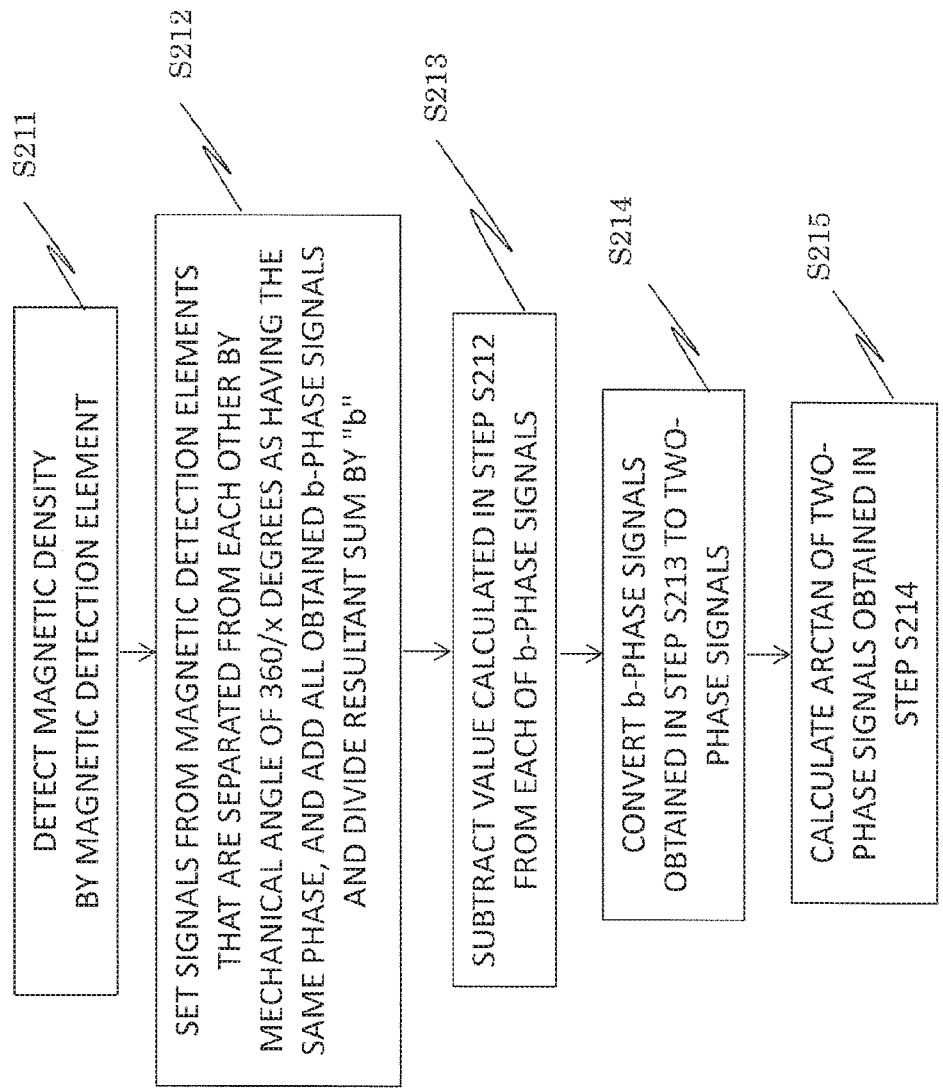
FIG. 6 is a flowchart for illustrating an example of an operation of the rotation angle calculation processing unit of FIG. 3.

With reference to the functional block diagram of FIG. 4 and a flowchart of FIG. 6, calculation processing to be performed by the rotation angle calculation processing unit 20 is described.

The magnetic detection element 4 detects a magnetic intensity and a magnetic density (Step S211 of FIG. 6).

Then, the DC offset calculation module 201 calculates a DC offset value from a reference voltage due to a DC component of the detection signal obtained by the magnetic detection element 4.

The DC offset correction module 202 corrects the detection signals obtained by the "b" magnetic detection elements 4 based on the DC offset value.

In this case, a DC offset being a DC component of a magnetic field is subjected to, for example, waveform averaging processing to calculate a DC offset amount, and the DC offset amount is subtracted from each phase signal, to thereby remove a DC offset. For example, in a case of three-phase signals, a DC offset component may be obtained by dividing a sum of phases of respective phase signals by 3, and the DC offset component may be subtracted from each phase signal. As another example, a DC offset component may be calculated based on a maximum value Max or a minimum value Min of an amplitude of the waveform.

The b-phase/two-phase conversion module 203 subjects the corrected "b" detection signals to b-phase/two-phase conversion to obtain two-phase signals (Step S214 of FIG. 6).

Now, an example of signal conversion in a case of b=3, that is, three-phase signals A, B, and C is shown in Expression (1) given below. Through this conversion, α and β being signals having phases different from each other by 90 degrees are obtained, and the signals can thus be converted into a sine wave and a cosine wave. Further, in Expression (1) given below, phases of 0, 120, and 240 degrees are used, but when phases of original waveforms differ from those phases, it is desired that phases of Expression (1) be set to the same phases as those of the original waveforms.

$$\begin{bmatrix} \alpha \\ \beta \end{bmatrix} = \begin{bmatrix} \cos 0 & \cos(120) & \cos(240) \\ \sin 0 & \sin(120) & \sin(240) \end{bmatrix} \begin{bmatrix} A \\ B \\ C \end{bmatrix} \quad (1)$$

$$= \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} A \\ B \\ C \end{bmatrix}$$

The angle calculation module 204 calculates an arctangent function (arctan) of the two-phase signals to calculate a rotation angle (Step S215 of FIG. 6).

For reference, the arctan can be calculated based on Expression (2) given below. This follows the general idea of trigonometric functions, $$\theta = \tan^{-1} \frac{\sin \theta}{\cos \theta} \quad (2)$$

The above-mentioned method, in which the sum of phase signals is obtained and a value obtained by dividing the sum by the number of phases is subtracted from each phase signal, may be provided as a separate step in addition to removing of a DC offset component. Through execution of this step as a separate step, electrical noise and magnetic noise that are input simultaneously to each sensor can be removed. With this, an influence due to an external factor is reduced, to thereby reduce an angle error. Thus, a highly robust sensor can be obtained.

Then, the display processing module 209 displays, for example, the calculated rotation angle on the display unit 30 illustrated in FIG. 3.

As described above, the DC offset calculation module 201 calculates an average value of a sum of instantaneous values of the detection signals obtained by the "b" magnetic detection elements 4. In this calculation, when the magnetic detection portions 34, that is, the magnetic detection elements 4 are arranged for a plurality of cycles, signals from the magnetic detection elements 4 that are separated from each other by a mechanical angle of 360$x$ degrees are set as having the same phase, and all the obtained b-phase signals are added and a resultant sum is divided by "b" (Step S212 of FIG. 6). A difference between the obtained average value and the reference voltage of, for example, a voltage of 0 corresponds to a DC component contained in the detection signal.

The DC offset correction module 202 then subtracts the obtained average value from each of the detection signals obtained by the "b" magnetic detection elements 4 (Step S213 of FIG. 6).

In another example, the DC offset calculation module 201 calculates a central value of a maximum value and a minimum value of each of the "b" magnetic detection elements 4. A difference between the central value and the reference voltage of, for example, 0 corresponds to a DC component contained in the detection signal.

The DC offset correction module 202 then subtracts the obtained central values from the respective detection signals obtained by the "b" magnetic detection elements 4.

Further, the inspection module 205 of FIG. 4 compares the "b" central values with each of the detection signals obtained by the magnetic detection elements 4, and when a difference between the detection signal and the central value is equal to or larger than a set reference value, the inspection module 205 determines that a function of the relevant magnetic detection element 4 is not normal.

The inspection module 205 further determines a failure of the magnetic detection portion 34, in particular, the magnetic detection element 4 and a state of decentering of the rotor 2 through comparison of the detection signals obtained at corresponding phase positions in one cycle with each other, which is described with reference to FIG. 1 and FIG. 2.

The display processing module 209 also displays on the display unit 30 a result of determination by the inspection module 205.

Through conversion of a b-phase magnetic flux density into a two-phase magnetic flux density to calculate the rotation angle in the manner described above, a component of a specific degree of the magnetic flux density can be removed, and hence detection accuracy is improved. Further, also through removal of the DC offset, detection accuracy and the like can be improved.

In the embodiment described above, a description has been given of the case of the configuration in which the rotor 2 is arranged inside and the stator 1 is arranged outside. However, the present invention is not limited thereto, and is also applicable to a case of a configuration in which the stator 1 is arranged inside and the rotor 2 is arranged outside. Further, the present invention is not limited to the above-mentioned configuration examples.

FIG. 7 to FIG. 11 are each a schematic sectional view of another configuration example of the detection unit of the rotation angle detection device according to the present invention.

Figure 7:
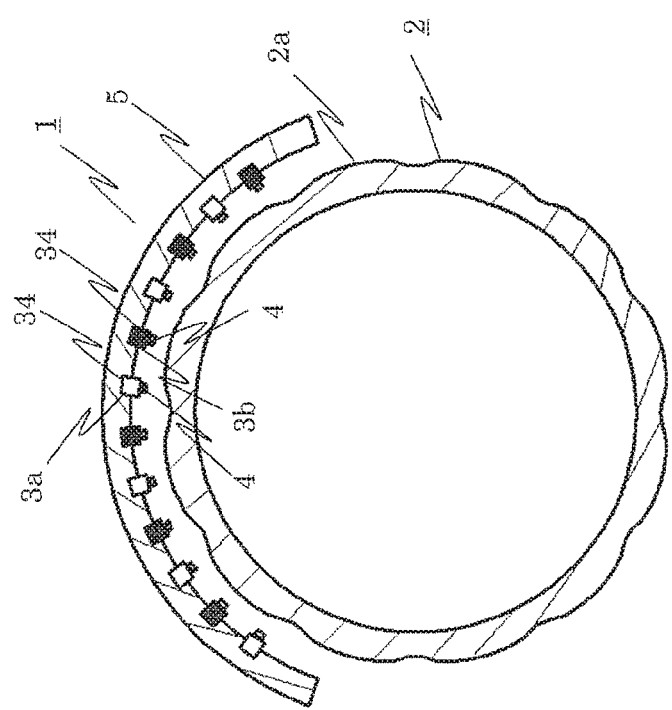
FIG. 7 is a schematic sectional view of another example of the detection unit of the rotation angle detection device according to the present invention.
Figure 8:
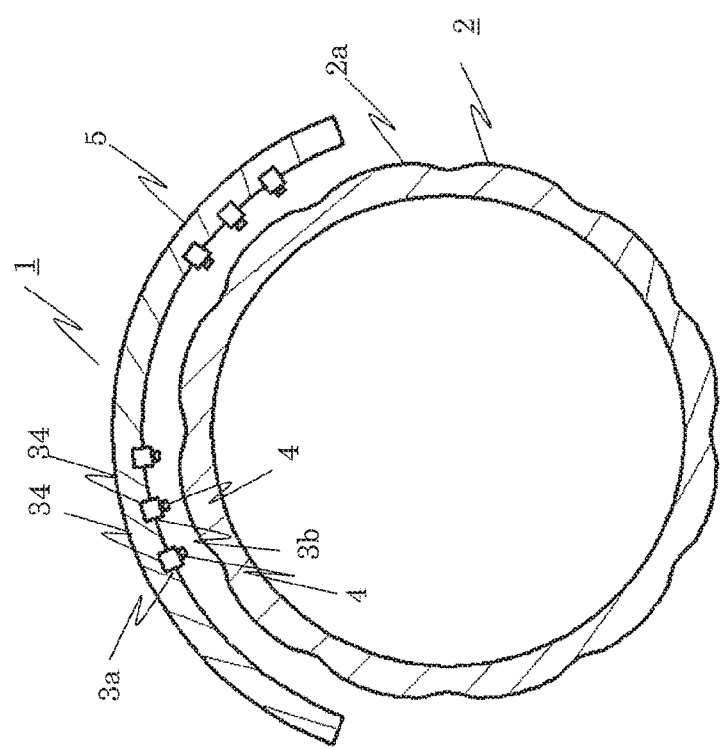
FIG. 8 is a schematic sectional view of still another example of the detection unit of the rotation angle detection device according to the present invention.
Figure 9:
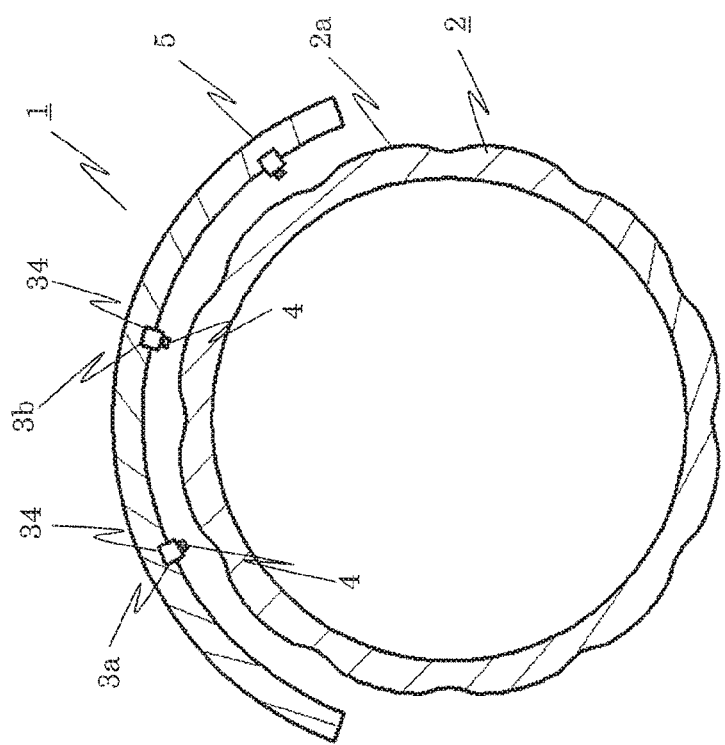
FIG. 9 is a schematic sectional view of still another example of the detection unit of the rotation angle detection device according to the present invention.

FIG. 7 is an illustration of a configuration in which three magnetic detection portions 34 are arranged for each of four consecutive first to fourth cycles of the convex and concave portions 2$a$ of the rotor 2. FIG. 8 is an illustration of a configuration in which three magnetic detection portions 34 are arranged for each of non-consecutive first and third cycles of the convex and concave portions 2$a$ of the rotor 2. FIG. 9 is an illustration of a configuration in which, for the three consecutive first to third cycles of the convex and concave portions 2$a$ of the rotor 2, one magnetic detection portion 34 is arranged at each of a position of 10 degrees for the first cycle, a position of 20 degrees for the second cycle, and a position of 30 degrees for the third cycle.

It is only required that "b" magnetic detection portions 34 of the stator 1 be arranged for one cycle of the convex and concave portions 2$a$ of the rotor 2 and be arranged at intervals of the mechanical angle of $360 \times (n \times b + m)/(x \times b)$ degrees, where "n" represents, by the number of cycles, a deviation amount of each of the magnetic detection portions 34 from the reference position in the circumferential direction and represents an integer of 0 or more, "m" represents a position of a magnetic detection portion 34 in the arrangement order of the "b" magnetic detection portions 34 and represents an integer of from 1 to "b", "x" represents the number of cycles of the convex and concave portions 2$a$ for the mechanical angle of 360 degrees and represents an integer of 1 or more, and "b" represents an integer of 3 or more.

Figure 10:
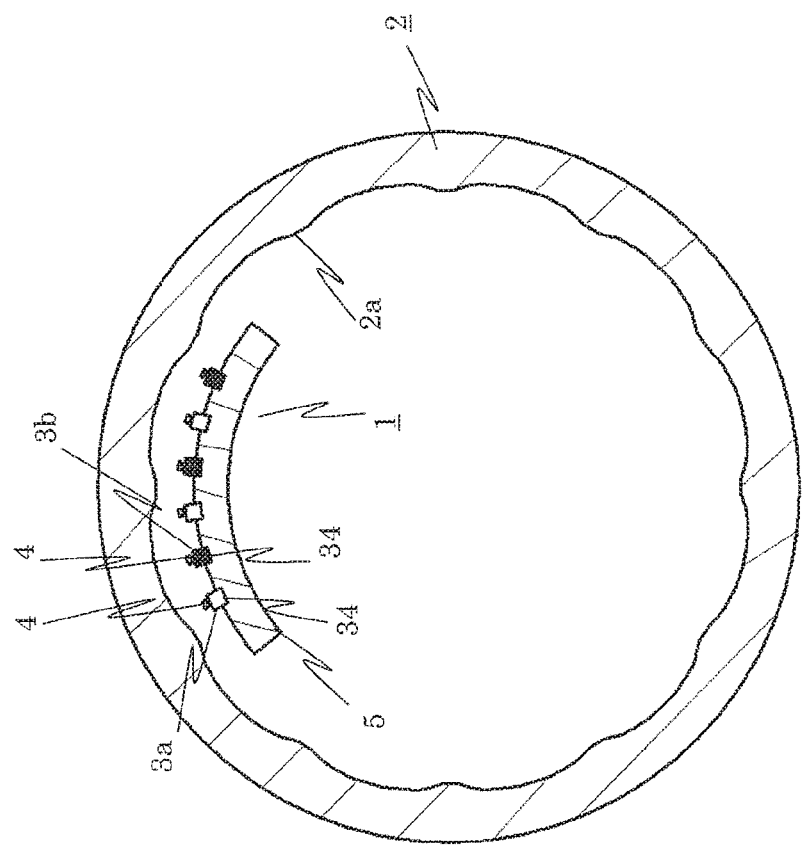
FIG. 10 is a schematic sectional view of still another example of the detection unit of the rotation angle detection device according to the present invention.

Further, when the magnetic detection portions 34 are not adjacent to each other as illustrated in FIG. 9, it is not necessarily required to alternately arrange the magnetic detection portions 34 having opposite magnetic flux directions, FIG. 10 is an illustration of a configuration of a case of an outer-rotor structure, in which the rotor 2 is arranged outside. In each of the examples described above, the case of the inner-rotor structure, in which the rotor 2 is arranged inside, has been described. However, the present invention is also applicable to a case of the outer-rotor structure, in which the rotor 2 is arranged outside.

FIG. 11 is an illustration of a configuration in which the rotor 2 has x=6, that is, six convex and concave portions 2a for the mechanical angle of 360 degrees, and the stator 1 is provided with b=5, that is, five magnetic detection portions 34 for one cycle of the convex and concave portions 2a of the rotor 2. In the present invention, the rotor 2 is only required to have the convex and concave portions 2a corresponding "x" cycles for the mechanical angle of 360 degrees, where "x" represents an integer of 1 or more. Further, the stator 1 is only required to have "b" magnetic detection portions 34 for one cycle of the convex and concave portions 2a of the rotor 2, where "b" represents an integer of 3 or more.

In addition, as illustrated in each of the drawings, the stator 1 may include a magnetic material 5. The magnetic material 5 is only required to be provided as required by a magnetic path configuration. In some cases, magnetic flux from a magnet does not reach the rotor but returns to the magnetic material 5 depending a magnetic path configuration, and hence whether to provide the magnetic material 5 depends on the design of a magnetic circuit. However, through provision of the magnetic material 5, the provided magnetic material may have an effect of shielding an influence from a magnetic field applied from the outside, for example, a magnetic field due to a coil of a motor. Thus, as long as the magnetic material 5 can be provided without a problem as a magnetic design, the magnetic material 5 can be provided as a shielding material without a problem.

INDUSTRIAL APPLICABILITY

The rotation angle detection device and the rotation angle detection method according to the present invention are applicable to detection of a rotation angle of a rotary member in various fields,

REFERENCE SIGNS LIST 1 stator, 2 rotor, 2a convex and concave portion, 3b bias magnetic field generation portion, 4 magnetic detection element, 5 magnetic material, 10 A/D conversion unit, 20 rotation angle calculation processing unit, 26 interface (I/F), 27 processor, 28 memory, 30 display unit, 34 magnetic detection portion, 201 DC offset calculation module, 202 DC offset correction module, 203 b-phase/two-phase conversion module, 204 angle calculation module, 205 inspection module, 209 display processing module

The invention claimed is:

1. A rotation angle detection device, comprising:
a rotor made of a magnetic material;
a stator including "b" or more magnetic detection portions each including a bias magnetic field generation portion and a magnetic detection element, where "b" represents an integer of 3 or more;
a processor to execute a program; and
a memory to store the program which, when executed by the processor, performs a process of calculating a rotation angle of the rotor based on detection signals obtained by the magnetic detection elements,
wherein a surface of the rotor that is opposed to the stator has convex and concave portions, which change in "x" cycles for a mechanical angle of 360 degrees, where "x" represents an integer of 1 or more, and the convex and concave portions have a shape that changes in a curved manner, the shape enabling each of the magnetic detection elements to obtain a substantially sine wave, and
wherein "b" magnetic detection portions of the stator are arranged along a circumferential direction of the stator for each cycle of the convex and concave portions so as to be opposed to, with a gap from, the surface of the rotor that is opposed to the stator, and are arranged at intervals of a mechanical angle of 360×(n×b+m)/(x×b) degrees, where "n" represents, by a number of cycles, a deviation amount of each of the "b" magnetic detection portions from a reference position in the circumferential direction and represents an integer of 0 or more, and "m" represents a position of a magnetic detection portion in an arrangement order of the "b" magnetic detection portions and represents an integer of from 1 to "b".

2. A rotation angle detection device, comprising:
a rotor made of a magnetic material;
a stator including "b" or more magnetic detection portions each including a bias magnetic field generation portion and a magnetic detection element, where "b" represents an integer of 3 or more;
a processor to execute a program; and
a memory to store the program which, when executed by the processor, performs a process of calculating a rotation angle of the rotor based on detection signals obtained by the magnetic detection elements,
wherein a surface of the rotor that is opposed to the stator has convex and concave portions, which change in "x" cycles for a mechanical angle of 360 degrees, where "x" represents an integer of 1 or more, and the convex and concave portions have a shape that changes in a curved manner, the shape enabling each of the magnetic detection elements to obtain a substantially sine wave, and
wherein "b" magnetic detection portions of the stator are arranged along a circumferential direction of the stator for one cycle of the convex and concave portions so as to be opposed to, with a gap from, the surface of the rotor that is opposed to the stator, and are arranged at intervals of a mechanical angle of 360/(x×b) degrees.

3. The rotation angle detection device according to claim 1,
wherein the bias magnetic field generation portion is configured to generate magnetic flux in a radial direction of the rotor, and
wherein the magnetic detection element has a detection surface arranged in such a direction as to detect the magnetic flux in the radial direction.

4. The rotation angle detection device according to claim 2,
wherein the bias magnetic field generation portion is configured to generate magnetic flux in a radial direction of the rotor, and
wherein the magnetic detection element has a detection surface arranged in such a direction as to detect the magnetic flux in the radial direction.

5. The rotation angle detection device according to claim 1, wherein the process of calculating the rotation angle of the rotor including processes of:

calculating a DC offset value from a reference voltage due to a DC component of each of the detection signals obtained by the magnetic detection elements;
correcting the detection signals obtained by the "b" magnetic detection elements based on the DC offset value;
subjecting the corrected "b" detection signals to b-phase/two-phase conversion to obtain two-phase signals; and
calculating an arctangent function of the two-phase signals to calculate the rotation angle.

6. The rotation angle detection device according to claim 2, wherein the process of calculating the rotation angle of the rotor including processes of:
calculating a DC offset value from a reference voltage due to a DC component of each of the detection signals obtained by the magnetic detection elements;
correcting the detection signals obtained by the "b" magnetic detection elements based on the DC offset value;
subjecting the corrected "b" detection signals to b-phase/two-phase conversion to obtain two-phase signals; and
calculating an arctangent function of the two-phase signals to calculate the rotation angle.

7. The rotation angle detection device according to claim 3, wherein the process of calculating the rotation angle of the rotor including processes of:
calculating a DC offset value from a reference voltage due to a DC component of each of the detection signals obtained by the magnetic detection elements;
correcting the detection signals obtained by the "b" magnetic detection elements based on the DC offset value;
subjecting the corrected "b" detection signals to b-phase/two-phase conversion to obtain two-phase signals; and
calculating an arctangent function of the two-phase signals to calculate the rotation angle.

8. The rotation angle detection device according to claim 4, wherein the process of calculating the rotation angle of the rotor including processes of:
calculating a DC offset value from a reference voltage due to a DC component of each of the detection signals obtained by the magnetic detection elements;
correcting the detection signals obtained by the "b" magnetic detection elements based on the DC offset value;
subjecting the corrected "b" detection signals to b-phase/two-phase conversion to obtain two-phase signals; and
calculating an arctangent function of the two-phase signals to calculate the rotation angle.

9. The rotation angle detection device according to claim 5,
wherein the process of calculating the DC offset value includes a process of calculating an average value of a sum of instantaneous values of the "b" magnetic detection elements, and
wherein the process of correcting the detection signals includes a process of subtracting the obtained average value from each of the detection signals obtained by the "b" magnetic detection elements.

10. The rotation angle detection device according to claim 6,
wherein the process of calculating the DC offset value includes a process of calculating an average value of a sum of instantaneous values of the "b" magnetic detection elements, and
wherein the process of correcting the detection signals includes a process of subtracting the obtained average value from each of the detection signals obtained by the "b" magnetic detection elements.

11. The rotation angle detection device according to claim 7,
wherein the process of calculating the DC offset value includes a process of calculating an average value of a sum of instantaneous values of the "b" magnetic detection elements, and
wherein the process of correcting the detection signals includes a process of subtracting the obtained average value from each of the detection signals obtained by the "b" magnetic detection elements.

12. The rotation angle detection device according to claim 8,
wherein the process of calculating the DC offset value includes a process of calculating an average value of a sum of instantaneous values of the "b" magnetic detection elements, and
wherein the process of correcting the detection signals includes a process of subtracting the obtained average value from each of the detection signals obtained by the "b" magnetic detection elements.

13. The rotation angle detection device according to claim 5,
wherein the process of calculating the DC offset value includes a process of calculating a central value of a maximum value and a minimum value of each of the "b" magnetic detection elements, and
wherein the process of correcting the detection signals includes a process of subtracting the obtained central values from the respective detection signals obtained by the "b" magnetic detection elements.

14. The rotation angle detection device according to claim 6,
wherein the process of calculating the DC offset value includes a process of calculating a central value of a maximum value and a minimum value of each of the "b" magnetic detection elements, and
wherein the process of correcting the detection signals includes a process of subtracting the obtained central values from the respective detection signals obtained by the "b" magnetic detection elements.

15. The rotation angle detection device according to claim 7,
wherein the process of calculating the DC offset value includes a process of calculating a central value of a maximum value and a minimum value of each of the "b" magnetic detection elements, and
wherein the process of correcting the detection signals includes a process of subtracting the obtained central values from the respective detection signals obtained by the "b" magnetic detection elements.

16. The rotation angle detection device according to claim 8,
wherein the process of calculating the DC offset value includes a process of calculating a central value of a maximum value and a minimum value of each of the "b" magnetic detection elements, and
wherein the process of correcting the detection signals includes a process of subtracting the obtained central values from the respective detection signals obtained by the "b" magnetic detection elements.

17. The rotation angle detection device according to claim 13, further comprising an inspection module configured to compare the "b" central values with the respective detection signals obtained by the magnetic detection elements to inspect whether a function of each of the magnetic detection elements is normal.

18. The rotation angle detection device according to claim 14, further comprising an inspection module configured to compare the "b" central values with the respective detection signals obtained by the magnetic detection elements to inspect whether a function of each of the magnetic detection elements is normal.

19. The rotation angle detection device according to claim 15, further comprising an inspection module configured to compare the "b" central values with the respective detection signals obtained by the magnetic detection elements to inspect whether a function of each of the magnetic detection elements is normal.

20. A rotation angle detection method, comprising:
arranging, to a rotor made of a magnetic material, a stator including "b" or more magnetic detection portions each including a bias magnetic field generation portion and a magnetic detection element with a gap between the stator and the rotor;
forming, on a surface of the rotor that is opposed to the stator, convex and concave portions, which change in "x" cycles for a mechanical angle of 360 degrees, where "x" represents an integer of 1 or more, the convex and concave portions having a shape that changes in a curved manner, the shape enabling each of the magnetic detection elements to obtain a substantially sine wave;
arranging "b" magnetic detection portions of the stator along a circumferential direction of the stator for each cycle of the convex and concave portions such that the "b" magnetic detection portions are opposed to, with a gap from, the surface of the rotor that is opposed to the stator, and arranging the "b" magnetic detection portions at intervals of a mechanical angle of $360\times(n\times b+m)/(x\times b)$ degrees, where "n" represents an integer of 0 or more and "m" represents an integer of from 1 to "b";
calculating a DC offset value from a reference voltage due to a DC component of each of the detection signals obtained by the magnetic detection elements of the magnetic detection portions;
correcting the detection signals obtained by the "b" magnetic detection elements based on the DC offset value;
subjecting the corrected "b" detection signals to b-phase/two-phase conversion to obtain two-phase signals; and
calculating an arctangent function of the two-phase signals to calculate a rotation angle.

\* \* \* \* \*